Patented Jan. 16, 1945

2,367,523

UNITED STATES PATENT OFFICE 2,367,523

IMINOPYRAZOLONES AND PROCESS OF PREPARING THEM

Henry D. Porter and Arnold Weissberger, Rochester, N. Y., assignors to Eastman Kodak Company, Rochester, N. Y., a corporation of New Jersey No Drawing. Application September 4, 1942, Serial No. 457,320

4 Claims. (Cl. 260—310)

This invention relates to iminopyrazolones and to a process of preparing them.

The principal object of the invention is to provide a method for the preparation of iminopyrazolones. A further object is to provide compounds useful in color photography as dye intermediates.

We have found that pyrazolone derivatives apparently having an imino group in the 5-position and a hydroxy group in the 3-position may be prepared by condensing an aryl hydrazine with cyanoacetyl chloride or cyanoacetyl azide to produce β-cyanoacetyl aryl hydrazine, and treating the latter compound with alkali to effect a ring closure. These compounds are useful in color photography, since they react with the oxidation product of certain photographic developers, such as dialkyl p-phenylenediamines, to produce dyes.

According to our preferred method, phenyl hydrazine is condensed with cyanoacetyl chloride to produce β-cyanoacetyl phenyl hydrazine. This compound, when treated with alkali, such as NaOH, KOH, or sodium alcoholate, forms the iminopyrazolone, or pyrazolone imide, by ring closure. The reaction apparently proceeds as follows:

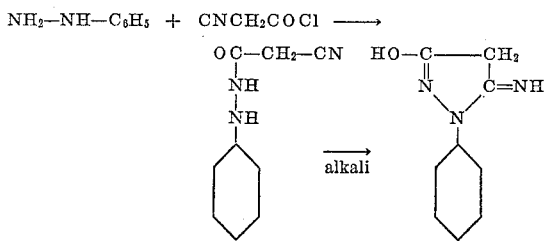

Our invention will be illustrated by reference to the following specific example:

To a solution of 47 g. of phenylhydrazine in 250 cc. of ethyl ether was added dropwise while stirring 24 g. of cyanoacetyl chloride (Schroeter and Fink, Ber. 71, 675 (1938)) in 80 cc. of ether, while cooling the product was filtered and washed with water and then extracted with 150 cc. of boiling 60% ethanol, from which the β-cyanoacetylphenylhydrazine crystallized on cooling. It was recrystallized from 50% ethanol, 10 g., M. P. 105–106°.

A solution of 80 g. of β-cyanoacetylphenylhydrazine in sodium methylate (21 g. of sodium in 320 cc. of methanol) was refluxed for one hour. After vacuum concentration, the residue was dissolved in 400 cc. of water, acidified and filtered. The 1-phenyl-3-hydroxy-5-pyrazolone imide was recrystallized from 500 cc. of water to give 60 g. M. P. 142–143°.

In addition to phenyl hydrazine, other aryl hydrazines may be employed, such as tolyl hydrazine, phenoxyphenyl hydrazine, nitrophenyl hydrazine, naphthyl hydrazine and others. In each case, the corresponding 1-aryl-3-hydroxy-5-pyrazolone imide is believed to be formed.

When cyanoacetyl azide was substituted for cyanoacetyl chloride, a somewhat higher yield was obtained. However, the hazards of working with this compound should not be forgotten. A small, two-day-old sample exploded with great vigor when warmed in a vacuum to remove the solvent ether.

The phenyl pyrazolone imide which we obtained is a colorless, crystalline substance. It is soluble in bases, such as sodium carbonate, and in acids. In sodium carbonate solution containing p-amino-dimethylaniline it gives a magenta dye on addition of an oxidizing agent.

Our compounds may be acylated to produce acyl derivatives which are useful in color photography. Treatment of the pyrazolone imide with acetyl chloride or acetic anhydride in pyridine and working up the reaction mixture with dilute alkali produce a monoacetyl derivative soluble in acid and in alkali which functions as a coupler. With benzoyl chloride or benzoic anhydride, the pyrazolone imide gives a dibenzoyl derivative, which, with dilute alkali, easily saponifies to a monobenzoyl derivative, which functions as a coupler. Treatment of the pyrazolone-imide with phenylisocyanide produces a phenylcarbamyl derivative which functions as a coupler.

It will be understood that our invention is not limited to compounds of the structure indicated above, but that we include within our invention all structures produced by our method.

We claim:

1. The method of producing a pyrazolone derivative, which comprises condensing an aryl hydrazine with a cyanoacetyl compound selected from the group consisting of cyanoacetyl chloride and cyanoacetyl azide, and treating the resulting compound with alkali to effect a ring closure to the pyrazolone.

2. The method of producing a pyrazolone derivative, which comprises condensing an aryl hydrazine with cyanoacetyl chloride, and treating the resulting compound with an alkali to effect a ring closure to the pyrazolone derivative.

3. The method of producing a pyrazolone imide, which comprises condensing phenyl hydrazine with cyanoacetyl chloride, and treating the resulting compound with an alkali to effect a ring closure to the pyrazolone imide.

4. The method of producing a pyrazolone imide, which comprises condensing phenyl hydrazine with cyanoacetyl chloride, and treating the resulting compound with sodium hydroxide solution to effect a ring closure to the pyrazolone imide.

HENRY D. PORTER.
ARNOLD WEISSBERGER.